United States Patent
Sennowitz

[15] 3,649,802
[45] Mar. 14, 1972

[54] PROTECTIVE SYSTEM FOR ELECTRICAL DISCHARGE MACHINING POWER SUPPLY CIRCUIT

[72] Inventor: Kurt H. Sennowitz, Royal Oak, Mich.
[73] Assignee: Elox Inc., Davidson, N.C.
[22] Filed: Dec. 28, 1970
[21] Appl. No.: 102,009

Related U.S. Application Data

[63] Continuation-in-part of Ser. No. 851,882, Aug. 21, 1969, Pat. No. 3,558,428, Continuation-in-part of Ser. No. 851,952, Aug. 21, 1969.

[52] U.S. Cl. .............................................. 219/69 C
[51] Int. Cl. ................................................ B23b 1/08
[58] Field of Search ................................... 219/69 C

[56] References Cited

UNITED STATES PATENTS 3,158,728  11/1964  Webb .................... 219/69 C

Primary Examiner—R. F. Staubly
Attorney—Hauke, Gifford and Patalidis

[57] ABSTRACT

A circuit is provided to sense an electrical parameter of the gap to determine whether electrical discharge machining is progressing properly. A gap parameter such as gap voltage or a voltage directly related to such parameter is compared to a variable reference voltage to provide reduction or interruption of machining power pulses. A control is included which conjointly controls frequency of machining pulses and the magnitude of the variable reference voltage.

10 Claims, 2 Drawing Figures

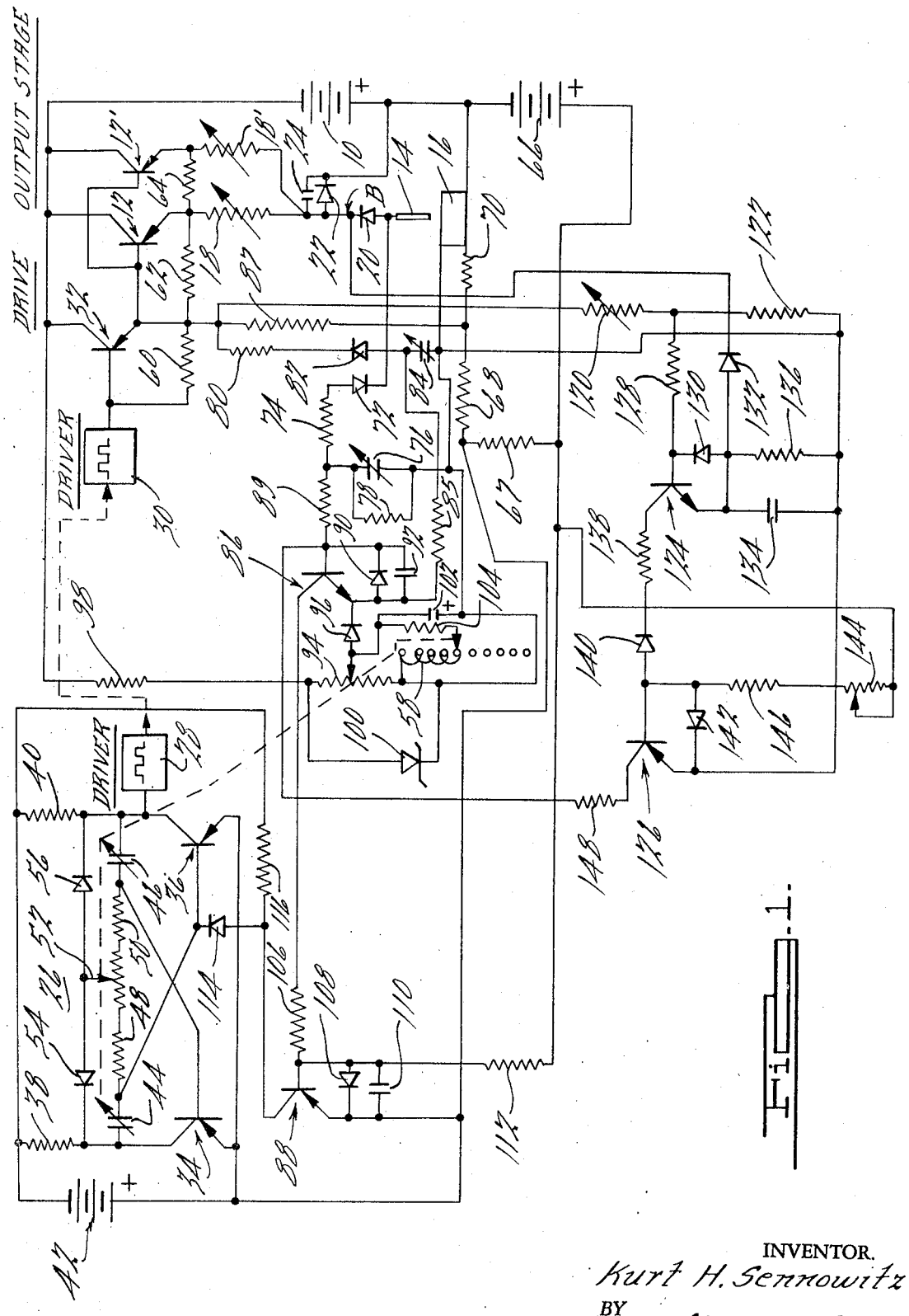

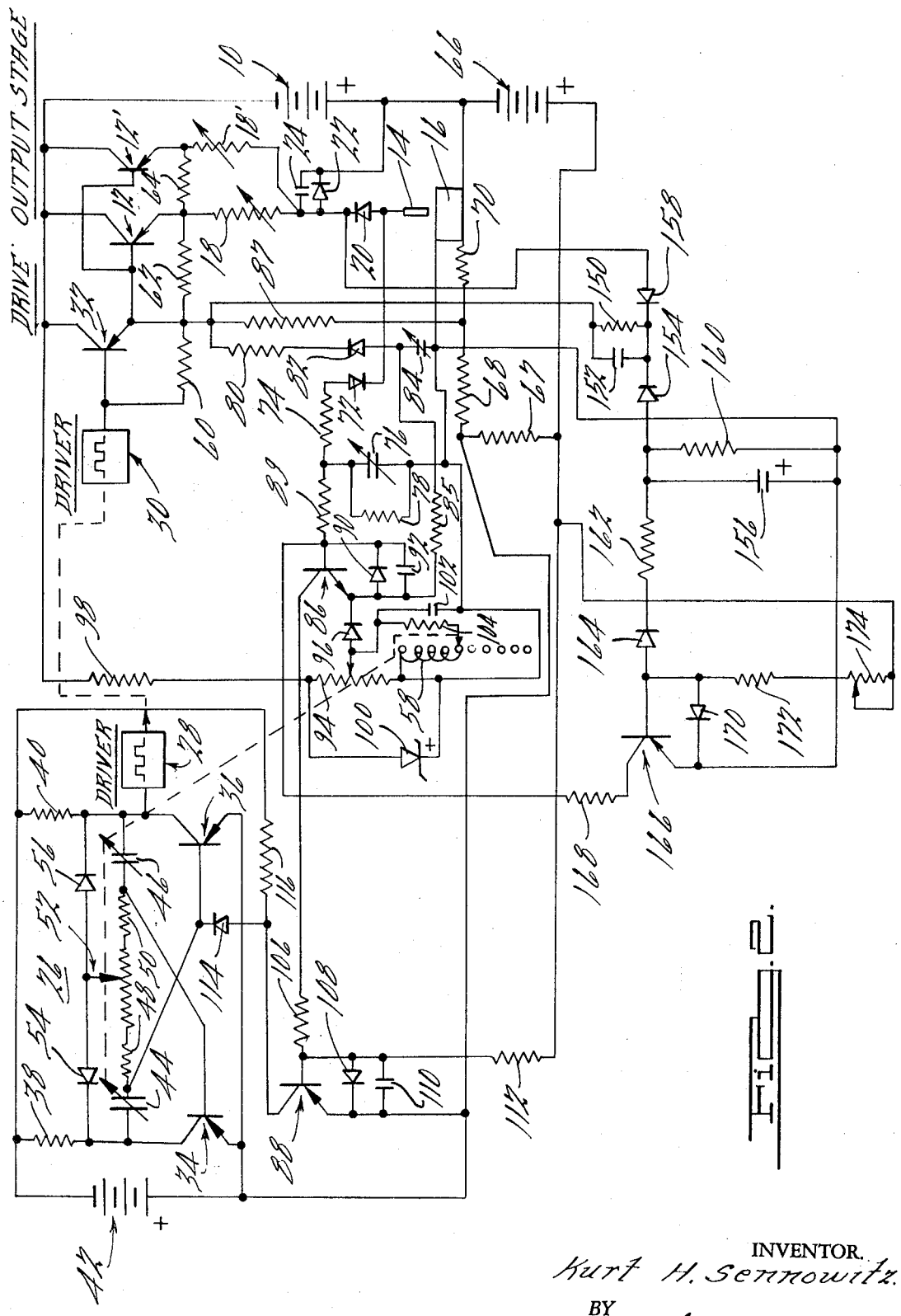

PROTECTIVE SYSTEM FOR ELECTRICAL DISCHARGE MACHINING POWER SUPPLY CIRCUIT

CROSS REFERENCE TO RELATED APPLICATIONS

This application is a continuation-in-part of my copending application, Ser. No. 851,882 filed on Aug. 21, 1969 now U.S. Pat. No. 3,558,428, issued June 28, 1971, for "Gap Open Circuit Protective System for Electrical Discharge Machining," and of my copending application, Ser. No. 851,952 filed on Aug. 21, 1969 for "Gap Short Circuit Protective System for Electrical Discharge Machining."

BACKGROUND OF THE INVENTION

The field to which my invention relates is that known as electrical discharge machining in which material is removed from an electrically conductive workpiece by the action of electrical gap discharges between a tool electrode and the workpiece. An electrode or workpiece servo-feed system is used to provide relative movement to maintain an optimum gap spacing between electrode and workpiece as material is removed. A dielectric coolant is circulated and recirculated through the gap during machining operation. For most reliable and predictable results, a power supply circuit of the independent pulse generator type is utilized to provide machining pulses of precisely controllable frequency and on-off time.

During the machining operation, the gap may become bridged by workpiece particles to cause a localized effect known as gap short circuit condition. This condition is accompanied by excessive localized heat which tends to damage both electrode and workpiece unless corrective action is taken. Gap open circuit condition is similarly a problem. Voltage of an excessive level can contribute to excessive sludge buildup and DC arcing. This is critical at the beginning of a cut, particularly if only a small portion of the electrode is initiating the cut, such as would occur in narrow slot machining operations. The present application is directed to an improved protective circuit which controls machining power responsive to an abnormal gap condition such as those described above. The protective circuit includes a variable reference voltage which is both preset and selectively varied according to the frequency of machining power pulses.

BRIEF DESCRIPTION OF THE DRAWINGS

FIG. 1 is a combined schematic and block diagrammatic showing a complete EDM protective circuit and incorporating my invention in that portion of the circuit related to gap short circuit control; and FIG. 2 is essentially similar to FIG. 1 but includes a somewhat different gap open circuit control arrangement.

DESCRIPTION

Referring now to the FIG. 1 drawing, a main machining power source 10 is shown connected with a pair of output stage transistors 12, 12' and in series with the machining gap comprising a tool electrode 14 and a workpiece 16. Gap current magnitude is controlled by variable resistors 18, 18'. Rectifier 20 is included in series between the tool electrode 14 and the output stage transistors 12, 12' to permit high gap voltage operation without damage to those transistors. A diode 22 and a capacitor 24 are included to clamp the transistors 12, 12' to the positive terminal of the DC supply 10 to eliminate high voltage spikes.

A multivibrator stage 26 and a plurality of successive driver stages 28, 30 and 32 are used to control the conduction of the output stage transistors 12, 12'. In the interest of simplification and brevity, the stages 28, 30 have been shown in block form. Included in the multivibrator 26 are a pair of transistors 34, 36, biased and cross coupled for alternate operation in the astable multivibrator mode. The transistors 34 and 36 are connected respectively through their load resistors 38 and 40 to the negative terminal of a DC source 42. A pair of cross-coupling capacitors 44, 46 are adjustable by ganged control and serve to connect collectors of the transistors 34, 36 each to the opposing transistor base. Variable capacitors 44, 46 may be embodied in the form of a plurality of different magnitude capacitors selectively connected in the circuit by a suitable tap switch. A pair of current-limiting resistors 48, 50 and a potentiometer 52 are included in the multivibrator circuit with the multivibrator on-off time, and the resultant machining power pulse width, controlled by the setting of the movable contact of the potentiometer 52. A pair of blocking diodes 54, 56 are connected as shown in circuit with the movable contact of the potentiometer 52. The frequency of the multivibrator operation and hence of the machining power pulses furnished to the gap may be selectively altered by changing the values of the capacitors 44, 46 by a ganged switch control as is indicated by the dash lines between those capacitors. A further dash line is shown between the capacitor 46 and the tap switch 58 to indicate automatic control of reference voltage level responsive to change of multivibrator operating frequency. The pulse output from the multivibrator 26 is suitably amplified and resquared through the intermediate drive stages 28, 30 and 32 to render the output transistors 12, 12' alternately conductive and nonconductive, and thus provide machining pulses to the gap. Resistors 60, 62, 64 protect the base emitter junction of their respective transistors from excess turnoff voltage. While the circuit including the present invention employs transistors as electronic switches, the invention is not so limited but, with proper redesign of the circuit and its components by one skilled in the art, other electronic switches may be substituted. By the term "electronic switch" is meant any electronic control device having three or more electrodes comprising at least two power electrodes acting to control current flow in the power circuit, the conductivity of the power circuit being controlled by a control electrode within the switch whereby the conductivity of the power circuit is controlled statically or electrically without movement of any mechanical elements within the switch. Included within this definition are vacuum tubes, transistors and other like devices.

The remainder of the circuit shown in FIG. 1 relates to the gap short-circuit- and gap open circuit-protective systems. With reference to the former, a bias source 66 is included with the resistors 67, 68, 70 connected thereto as a voltage divider. The sensing network connected to the tool electrode 14 includes a diode 72 and a variable capacitor 76 whose charge and discharge rate depends on the values of a resistor 78 and the capacitor 76. The setting of the capacitor 76 is normally such to provide normal cutoff delay during roughing, high current cutting and fast cutoff during finish low current cutting, especially when machining is performed at high frequencies.

A separate sensing network is connected to the drive stage comprising the transistor 32. This network is designed to feed back, store and amplify a portion of the drive signal to provide pulse narrowing operation on the multivibrator 26, particularly with response to control of the conduction of the transistor 36 which is the on-time control transistor.

Included in this network are a resistor 80, a diode 82 and a capacitor 84. The drive signal taken from the emitter of the transistor 32 charges capacitor 84 to the polarity shown. Resistor 85 with the reference voltage level across the capacitor 84 determines the charge and discharge levels and the time constant. The capacitor 84 is embodied as a variable magnitude capacitor to permit adjustment for the desired gap current during a gap short circuit condition or before the gap actually shorts, depending on the reference voltage adjustment. A load resistor 87 is connected between the emitter of transistor 32 and a positive voltage derived from the bias source 66.

Actual control over machining power pulse duration is exercised through the cutoff transistors 86 and 88. A resistor 89 is the drive limiting resistor for the transistor 86. A diode 90 protects the base to emitter junction of the transistor 86 from excess turnoff voltage. A capacitor 92 prevents pretriggering of the transistor 86 due to stray signals. The transistor 86 is maintained in a nonconductive state so long as the negative electrode gap voltage on its base is more negative than the preset reference voltage on variable resistor 94 applied through a hold-off diode 96 to its emitter. Resistor 98 is a part of the divider network across the DC source 10. A zener diode 100 stabilizes the reference voltage, while a capacitor 102 provides a filter for the preset reference voltage. As has already been indicated, a resistor 104 is switched across the preset portion of variable resistor 94 conjointly with each change made in frequency to the multivibrator 26 by adjustment of the capacitors 44, 46. I have found that certain electrode materials cut a great deal more efficiently when higher cutoff reference voltage is used along with the higher frequency settings of the multivibrator 26.

The short circuit cutoff transistor 86 has its collector connected to the base of a transistor 88 through a drive limiting resistor 106. A diode 108 is a protective diode for the base to emitter junction while a capacitor 110 filters out stray pickup to prevent pretriggering of the transistor 88. A resistor 112 applies a positive bias signal across the emitter-base junction of the transistor 88 during its off-time. A diode 114 isolates the cutoff circuit from the base of the transistor 36 during normal machining operation. A resistor 116 is connected to the negative terminal of DC source 42 and to the rectifier 114, transistor 88 collector junction to insure normal multivibrator operation during cutting.

The open circuit pulse narrowing circuit similarly uses the cutoff transistors 86 and 88 to exercise its current reducing function. A reference network is connected between the emitter of drive transistor 32 and the plus arc terminal provided by the workpiece 16. This network includes a pair of series resistors 120 and 122 connected as a voltage divider. The open circuit pulse narrowing circuit includes transistors 124 and 126. A resistor 128 is the drive-limiting resistor for the transistor 124. A rectifier 130 protects the transistor 124 base to emitter junction from excess turnoff voltage. A gap voltage sensing network is connected between the lead to the electrode 14 and the emitter of the transistor 124. This network includes a diode 132 and a capacitor 134. It will be seen that the diode 132 senses and peak stores a portion of the gap voltage on the capacitor 134, to provide a gap voltage signal on the emitter of the transistor 124. A resistor 136 connected across the capacitor 134 determines the RC time constant of operation. The transistor 124 will conduct when the negative gap voltage at point B and on the emitter of the transistor 124 is more negative than the preset pulsed voltage on the base of the transistor 124. A resistor 138 limits the drive current to the base of the transistor 126 through an isolating diode 140. A diode 142 protects the base to emitter junction of the transistor 126 from excess turnoff voltage. A variable resistor 144 is connected to the positive terminal of bias source 66 and in series with a resistor 146. A resistor 148 is connected as the transistor current limiter.

The circuit of FIG. 2 is substantially the same as FIG. 1 with respect to the EDM power supply circuit and that portion of the circuit related to gap short circuit condition current control. The gap circuit current control portion incorporates some differences. A resistor 150 and a capacitor 152 couple the drive signal during the drive transistor 32 off-time through diode 154 to charge a capacitor 156 to the polarity shown. The capacitor 156 is shunted by a resistor 160. The drive signal will also be passed to the gap through a diode 158, if the negative gap voltage drops. A rectifier 158 clamps the drive signal to the minus gap voltage. A drive current limiting resistor 162 and a series diode 164 transfer the negative drive signal to the base of the transistor 166 to turn it on. A load resistor 168 limits the current of the transistor 166 and places a positive signal on the base of transistor 86 to turn it on. In the conductive state of transistor 86, transistor 88 is turned on, as has already been explained, to narrow the on-time of multivibrator 26, and hence limit the cutting current passed to the gap. The associated circuit of the transistor 166 is completed by a protective diode 170, a fixed resistor 172, and a variable resistor 174. The resistor 174 is connected to the positive terminal of DC bias source 66 to provide a positive turnoff bias voltage to the base of the transistor 66.

DESCRIPTION OF OPERATION

The description of operation will now be made with special attention given to the gap short-circuit- and gap open circuit-protective systems and their functioning in conjunction with multivibrator 26. During rough machining, the multivibrator 26 is preset through the potentiometer 52 to provide high current, long on-time pulses. The on-time of the machining pulses is controlled through the conduction of the transistor 36, while the off-time is controlled through the conduction of the transistor 34. During this mode of operation, the variable capacitor 76 is adjusted to give a relatively large cutoff delay period. This serves to improve cutting stability and improve metal removal. During the initial open arc condition when the electrode 14 is being advanced toward the workpiece 16 to start cutting and during normal gap-cutting condition, the transistor 86 is in its nonconducting state. The negative arc voltage taken from the electrode 14 and peak stored on the capacitor 76 is applied to the base of the transistor 86. Since the applied voltage is more negative than the reference voltage applied to its emitter, transistor 86 will stay off. During this period, the transistor 88 is also nonconducting, so that the multivibrator 26 is not affected in its operation.

When a gap short circuit actually occurs or is impending, the gap voltage will drop below the preset reference voltage applied to the emitter of the transistor 86. When the base is rendered more positive than the emitter, the transistor 86 will be rendered conductive. This will apply a negative signal to the base of PNP-transistor 88 to turn it on. In its conductive state, the transistor 88 will place a positive signal on the base of the transistor 36 through diode 114 to turn it off. Since the transistor 36 controls machining pulse on-time, the pulses will be substantially narrowed or even completely interrupted. An adjustable delay is exercised through the discharge of the capacitor 84 through the resistor 85 into the emitter of the transistor 86. This will hold the transistor 86 off for a short period during the initial part of the gap short circuit condition and delay the pulse narrowing effect. When roughing is completed, the multivibrator 26 is normally changed to operate at a much higher frequency for finishing the cut. As capacitors 44, 46 were first adjusted for the lower pulse frequencies, the resistor 104 was switched across the preset portion of the variable resistor 94 to provide a relatively low cutoff reference voltage. For the higher frequency settings, the resistor 104 is disconnected from across the variable resistor 94 to provide a relatively high reference voltage. During the finishing operation, little or no cutoff delay is desirable and the capacitor 84 is usually adjusted accordingly.

Open circuit condition operation will now be considered with reference to the circuit of FIG. 1. On initial downfeed it is important that the on-time be shortened and the off-time be lengthened for a lower frequency than the normal cutting frequency. This serves not only to protect the workpiece 16 and the electrode 14 from damage, but also to protect the output stage switches 12, 12' from damage when current is passed at higher voltage than normal cutting voltage. The transistor 124 is normally nonconductive. The desired open arc narrowing voltage range is set on the reference voltage divider network comprising the resistors 120 and 122 and applied to the base of the transistor 124. The gap voltage is sensed through the diode 132 and peak stored on the capacitor 134. When the negative gap voltage sensed is more negative than the preset pulsed reference voltage on its base, the transistor 124 is turned on. This will provide a negative voltage to the base of the transistor 126 and turn it on to provide voltage to the base of the transistor 86 which will in turn be rendered conductive. The pulse narrowing signal then is passed to the multivibrator 26 in the manner previously described for short circuit narrowing. The open circuit pulse narrowing arrangement of FIG.

2 is similarly connected in the power supply circuit. The voltage signal provided from the drive stage transistor 32 during its off-time is coupled through the rectifier 154 to charge capacitor 156 to the polarity shown. The transistor 166 is normally in a nonconducting state. The negative drive signal is transferred to the base of the transistor 166 to turn it on when gap open circuit level is reached. The resistor 172 and the variable resistor 174 are connected to the plus terminal of the bias source 66 to hold a turnoff bias on the base of the transistor 166. This bias on the base of the transistor 166 prevents oscillations and false turn-on during normal cutting. The divider network resistors 150, 160 and the capacitors 152, 156 values determine the open circuit pulse narrowing voltage across the gap together with the resistor 174 bias setting required to turn on the transistor 166. Once the transistor 166 is turned on, it will pass a positive signal to the base of the transistor 86 to turn it on and initiate the pulse narrowing operation previously described on multivibrator 26. One feature of the FIG. 2 open circuit pulse narrowing system is that it operates without taking any power from the machining gap or output transistor stages. It actually passes current to the gap through the rectifier 158 during normal cutting conditions.

It will thus be seen that I have provided a novel and improved circuit for abnormal gap voltage protection and one in which suitably adjusts the cutoff level in accordance with the frequency at which EDM machining is being conducted.

I claim:

1. In an electrical discharge machining apparatus for machining an electrically conductive workpiece by passing electrical discharges across a dielectric coolant filled gap between a tool electrode and the workpiece, an electronic output switch and a power supply operatively connected across said gap, a pulser means operatively connected to said switch for operating it with pulses of selectively variable on-off time and frequency, wherein the improvement comprises a circuit for reducing the power content of said pulses responsive to gap abnormal condition, said circuit comprising a variable reference voltage network, a sensing network operatively connected to said gap for sensing a parameter representative of gap condition and providing a voltage output representative thereof, a cutoff means operatively connected to both said networks and operable to reduce the on-time of said pulser responsive to a predetermined difference between said voltages, and means operatively connected between said pulser means and said reference voltage network for varying the magnitude of said reference voltage in response to the frequency preset on said pulser.

2. In an electrical discharge machining apparatus for machining an electrically conductive workpiece by passing electrical discharges across a dielectric coolant filled gap between a tool electrode and the workpiece, an electronic output switch and a power supply operatively connected across said gap, a pulser means operatively connected to said switch for operating it with pulses of selectively variable on-off time and frequency, wherein the improvement comprises a circuit for reducing the power content of said pulses responsive to abnormal gap voltage condition, said circuit including a variable reference voltage network, a sensing network coupled to one terminal of said gap for sensing gap voltage and providing a voltage output representative thereof, a cutoff means operably connected to the output of both said networks and operative to reduce the on-time of said pulser responsive to the relative values of said voltages, and means operably connected between said pulser and said cutoff means for varying the magnitude of said reference voltage in accordance with the frequency setting of said pulser means.

3. In an electrical discharge machining apparatus for machining an electrically conductive workpiece by passing electrical discharges across a dielectric coolant filled gap between a tool electrode and the workpiece, an electronic output switch and a power operatively connected to said gap, a presettable multivibrator operatively connected to said electronic switch for operating it with pulses of selectively variable and on-off time frequency, wherein the improvement comprises a protective circuit for reducing the on-time of said pulses responsive to gap abnormal condition, said circuit comprising a variable reference voltage network, a sensing network coupled to one terminal of said gap for providing an output responsive to gap voltage condition, a cutoff switch operatively connected to both of said networks and having its output operatively connected to said multivibrator to reduce its on-time, and a control means operatively connected between said multivibrator and said reference voltage network for varying the level of said reference voltage network responsive to the frequency setting of said multivibrator.

4. The combination as set forth in claim 3 wherein said control means is operable to lower the level of said reference voltage at relatively low frequency settings of said multivibrator and to raise the level of said reference voltage at relatively high frequency settings of said multivibrator.

5. The combination as set forth in claim 3 wherein said multivibrator comprises an astable multivibrator including a variable capacitor operatively connected thereto for selectively varying the frequency of said multivibrator and wherein said reference voltage network includes a variable resistor, said control means comprising a ganged operating means operatively connected between said variable capacitor and said resistor.

6. The combination as set forth in claim 5 wherein said multivibrator includes a pair of transistors rendered alternately conductive and nonconductive and wherein said cutoff switch comprises a third transistor having its control electrode and one of its principal electrodes each connected to a different one of said networks, and its other principal electrode coupled to the control electrode of one of said multivibrator transistors for controlling its conduction.

7. In an electrical discharge machining apparatus for machining an electrically conductive workpiece by passing electrical discharges across a dielectric coolant filled gap between a tool electrode and the workpiece, an electronic output switch and a power supply operatively connected to said gap, a presettable multivibrator operatively connected to said electronic switch for operating it with pulses of selectively variable frequency and on-off time, wherein the improvement comprises the protective circuit for reducing the on-time of said pulses responsive to gap short circuit condition, said circuit comprising a variable reference voltage network, a sensing network coupled to said gap for providing an output responsive to gap voltage condition, a cutoff means operatively connected to both of said networks and having its output operatively connected to said multivibrator to reduce its on-time, and a control means operatively connected between said multivibrator and said reference voltage network for conjointly varying the level of said reference voltage network in accordance with the frequency setting of said multivibrator.

8. The combination as set forth in claim 7 wherein said control means is operable to lower the level of said reference voltage at relatively low frequency settings of said multivibrator and further operable to raise the level of said reference voltage at relatively high frequency settings of said multivibrator whereby changeover is made between rough and finishing operation.

9. The combination as set forth in claim 8 wherein said multivibrator comprises an astable multivibrator including a variable capacitor operatively connected thereto for selectively varying the frequency of said multivibrator and wherein said reference voltage network includes a variable resistor, said control means comprising a ganged operating means operatively connected between said variable capacitor and said resistor.

10. The combination as set forth in claim 9 wherein said multivibrator includes a pair of transistors rendered alternately conductive and nonconductive and wherein said cutoff switch comprises a third transistor having its control electrode and one of its principal electrodes each connected to different one of said networks and its other principal electrode coupled to the control electrode of one of said multivibrator transistors for controlling its conduction and thereby controlling the on-time of said pulses.

* * * * *